United States Patent [19]

Münzner et al.

[11] 3,979,330

[45] *Sept. 7, 1976

[54] CARBON CONTAINING MOLECULAR SIEVES

[75] Inventors: Heinrich Münzner, Essen-Kray; Heinrich Heimbach, Bochum; Werner Körbacher, Essen-Borbeck; Werner Peters, Wattenscheid; Harald Jüntgen, Essen-Heisingen; Karl Knoblauch, Essen; Dieter Zündorf, Essen-Heisingen, all of Germany

[73] Assignee: Bergwerksverband GmbH, Essen, Germany

[ * ] Notice: The portion of the term of this patent subsequent to Apr. 2, 1991, has been disclaimed.

[22] Filed: Feb. 21, 1974

[21] Appl. No.: 444,381

Related U.S. Application Data

[62] Division of Ser. No. 161,211, July 9, 1971, Pat. No. 3,801,513.

[30] Foreign Application Priority Data

Apr. 23, 1971  Germany............................ 2119829

[52] U.S. Cl................................ 252/445; 252/421; 252/444; 423/219
[51] Int. Cl.$^2$......................................... C01B 13/00
[58] Field of Search...................... 252/421, 444, 445

[56] References Cited

UNITED STATES PATENTS 3,801,513  4/1974  Munzner et al................. 252/444 X

*Primary Examiner*—Patrick P. Garyin
*Attorney, Agent, or Firm*—Michael J. Striker

[57] ABSTRACT

Process for preparing carbon containing molecular sieves adapted for separating small molecular gases in particular oxygen from nitrogen which comprises treating coke having a content of volatile components of up to 5% at 600°–900°C with a hydrocarbon splitting off carbon whereby the split-off carbon is deposited in the carbon framework of the coke under narrowing of the existing pores.

21 Claims, 1 Drawing Figure

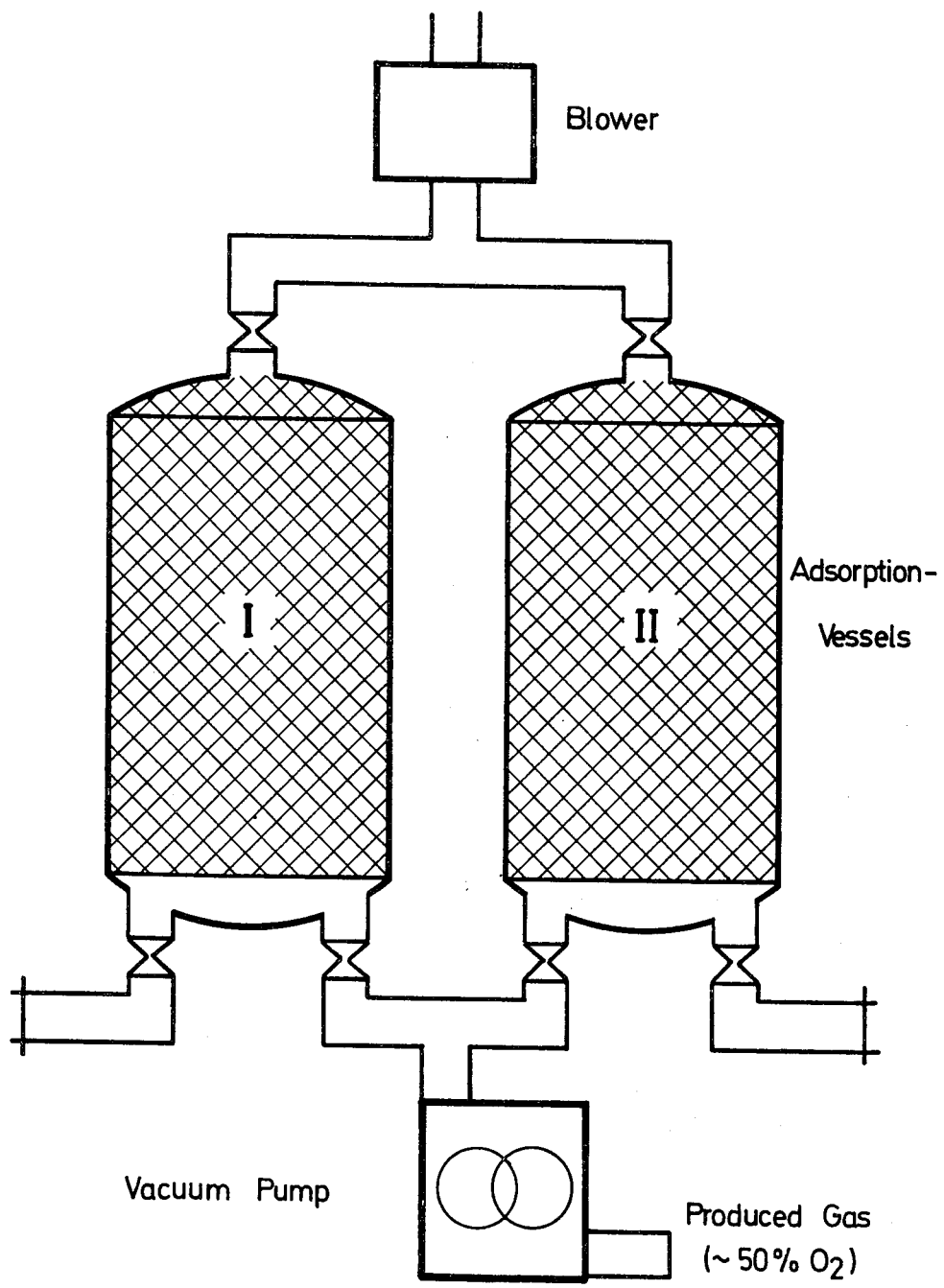

CARBON CONTAINING MOLECULAR SIEVES

This is a division of application Ser. No. 161,211 filed July 9, 1971, now U.S. Pat. No. 3,801,513, issued Apr. 2, 1974.

This invention relates to a carbon containing molecular sieve and more particularly to a carbon containing molecular sieve characterized by its ability to separate small molecular gases from gas mixtures containing the same.

The known silicate molecular sieves are possessed of the property that they can adsorb a single gas from gas mixtures containing the same. The carbon containing molecular sieves such as those manufactured by pyrolysis of plastics e.g. polyvinylidene chloride do not evidence any or only a very slight selectivity respecting the adsorption of gases having similar gas kinetic molecular diameters, such as for instance oxygen and nitrogen, argon and oxygen or helium and methane. Therefore for carrying out a practical and technical scale separation of oxygen and nitrogen from air, the known carbon containing molecular sieves are not suitable and especially so since it is difficult to obtain them in large amounts.

The object of the instant invention is a new type of carbon containing molecular sieve which is characterized in that in can for example adsorb oxygen more rapidly from air than nitrogen.

Another object of this invention is to provide a simple and economically feasible method of manufacturing such carbon containing molecular sieves.

Still another object of this invention is to provide a method for the preparation of such molecular sieves which affords the possibility of setting up large-scale installations for gas separation procedures in connection with which these molecular sieves will be used in ton amounts.

Still another object of this invention is to provide a process for increasing the oxygen content in air to provide concentrations of up to 75% $O_2$.

These and other objects and advantages of the invention will become apparent from a consideration of the following disclosure.

In accordance with the invention it has now been found that coke having a content of volatile components of up to 5% on being treated for a certain time at 600°–900°C with a hydrocarbon splitting off carbon results in the formation of molecular sieves of excellent quality. In accordance with the invention there is now provided a process for manufacturing carbon containing molecular sieves for use in the separation of small molecular gases in particular oxygen from nitrogen which comprises treating coke having a content of volatile components of up to 5% with a hydrocarbon splitting off carbon at 600°–900°C whereby the coke undergoes narrowing of the pores already present therein. The finely dispersed carbon formed is deposited out in the already small pores of the coke and brings about a further decrease in the pore size of the coke's already relatively small pores.

To produce a molecular sieve type carbon suitable for separating oxygen from nitrogen, the average pore size of the ultra fine pore system must be below approximately 3 A. after treatment. For separating even smaller gas molecules, this average pore diameter has to be even smaller. By changing the intensity of the treatment of the coke with hydrocarbons splitting off carbon at 600°–900°C, the average pore diameter can be adjusted according to the gas mixture to be separated therewith.

The quality and suitability of the coke thus produced can be established by passing air for a one minute period upwardly through a tube (1L) filled with the carbon containing molecular sieves, the gas being conducted at a velocity of 30 cm/sec. and thereafter analyzing the adsorbed gas following desorption by vacuum suction filtering.

When tested as just set out, coke produced in accordance with the invention results in a gas having a composition of 35 and more volume % oxygen and 65 or less volume % of nitrogen.

In order to obtain the desired constriction or narrowing of the pores, the treatment of the coke with the hydrocarbon is carried out for from 1 to 60 minutes and even longer. The cooling of the heated material is then carried out most advantageously in the treatment atmosphere. There can also be used during the cooling streams of an inert gas for instance, nitrogen. This accelerates the cooling and serves the additional purpose that in the cooling the introduction of any oxygen is avoided.

As coke, there is suitable for use in the process all forms of coke containing up to 5% volatile components such as cokes derived from mineral coal including anthracite, brown coal, peat coconut shell and wood and also the known petroleum cokes, cokes prepared by the pyrolysis of plastics and active carbons. In order that the gases to be separated can pass through the molecular sieves it is advantageous in accordance with the invention that as starting material there by used a coke having a designated particle size and in particular having a particle size of from 0.1–20 mm.

As hydrocarbon there may be advantageously used in the treatment the exhaust gas of a coke forming process long distance illuminating gas, city gas, coking gas and all of the known hydrocarbons which are thermally decomposed with the splitting off of carbon such as benzene, toluene, xylene, naphthaline, methane, ethane, hexane, cyclohexane, ethylene, acetylene, methanol, ethanol, isopropanol, ethylene chloride and tetrachlorinated hydrocarbons.

Instead of using coke which is through size reduction brought to the desired particle size, there can also be used in accordance with the invention, coke formed and shaped to have the respective dimensions. In this connection, there come into consideration ball-, cylinder-hollow cylinder- and egg-shaped coke particles as well as larger coke briquettes which are reduced to the required particle size. The manufacture of shaped coke particles can take place using various methods:

1. Coke and/or carbon is suitably formed into briquettes according to any desirable briquette-forming process, for instance under use of 15–40% of a binding agent such as pitch, bitumin, tar or tar oil and the shaped bodies thus formed coked at 600°–900°C. The briquetting can take place at normal temperature or increased temperature using a stamping press, extrusion press or rolling press.

2. Carbon is shaped if necessary in admixture with pitch, bitumin, tar or tar oil and pelleterized to form balls of the desired size and these pellets then coked.

The treatment in accordance with the invention can be carried out by heating the cold coke under an inert gas stream at a temperature of up to 600°–900°C and then under a carbon splitting atmosphere maintained at this temperature for prolonged periods. Alternatively the treatment can be carried out directly after a coking of the starting material in the same or an after arranged reactor. If the coking is carried out with pitch, bitumin, tar or tar oil containing starting materials there are formed in the process, large amounts of gaseous coking products in the heat treatment. As far as these coking products are not for example separated off with a rinsing or scavenger gas, the desired atmosphere is automatically adjusted so that the gas formed coking product already exert the same effect as a carbon splitting off hydrocarbon. In this case, it is possible to avoid introduction of at least a part of the hydrocarbon. Often the constitution of the coke can be modified through the additional introduction of hydrocarbon and also in such cases there can be provided a further increase in the separating capacity of the coke.

Technical application of the molecular sieve type carbons which are intended to increase the oxygen content in air or another component in a known gas mixture is further explained by the process illustrated in the drawing which forms a part of this disclosure. In the process, two adsorption vessels I and II are alternately charged with air and depleted of the accumulated oxygen by vacuum suction. The pressure during the charging phase is maintained at between 0 and 40 atm, desorption taking place at pressures ranging to a minimum of 20 Torr. The duration of the adsorption respectively desorption phases is between 0.5 and 5 minutes. The gas volume necessary for the charge cycle amounts to 2 to 20 times that of the adsorption vessel.

The following Examples are given in order to more fully illustrate the invention are are in nowise to be construed as limiting the scope thereof.

EXAMPLE 1

77 Weight parts mineral coal having a particle size of 100% < 0.08 mm was treated in a whirling bed with air having a temperature of 230°C and having an oxygen content of up to 12 weight % was mixed with 23 weight parts soft pitch (softening point according to Kraemer-Sarnow 52°–56°C) under addition of water, the mixing taking place about 70°C. The resulting mixture was placed in an extruder and formed into cylindrical bodies having a cross-section of 2 mm. The formed bodies were then introduced into a rotating oven where under exclusion of air they were subjected to an average temperature increase of 10° per minute until a final temperature of 800°C had been obtained. At 750°C a nitrogen gas stream was introduced into the oven. After reaching a temperature of 800°C there was introduced together with the nitrogen gas stream 100 g benzene/$Nm^3$ and this treatment continued at constant temperature for 20 minutes. Thereafter, the bodies were cooled under pure nitrogen.

The test for evaluation of the resultant bodies as described above was carried out and there was produced a gas having the following composition: 54 volume % oxygen and 46 volume % nitrogen. When the text was repeated using instead of air a gas containing 50 volume % of oxygen and nitrogen the composition of the resulting gas's composition amounted to 83 oxygen and 17 nitrogen.

If instead of air, a gas mixture consisting of 23 volume % oxygen and 77 volume % Ar was used the final gas composition contained 59% oxygen and 41% Ar.

EXAMPLE 2

77 Weight parts mineral coal having a particle size 100% < 0.08 mm was treated in a whirling layer with air at 230°C up to an oxygen content of 12 weight % and mixed with 23 weight parts soft pitch (softening point according to Kraemer-Sarnow 52°–56°C) under addition of water at 70°C. The mixture was placed in an extrusion press and shaped into cylindrical bodies having a cross-section of 2 mm and treated under exclusion of air in a rotating oven with an average temperature increase of 10° per minute up until a final temperature of 800°C was reached. The thusly treated bodies had a content of volatile component amounting to 2%. Then under introduction of nitrogen the bodies were cooled to room temperature.

The test for evaluating the bodies resulted in a gas having the following composition: 42 volume % oxygen and 58 volume % nitrogen.

EXAMPLE 3

80% anthrazite having 8% volatile components and 20% bituminous coal having a 20.5% volatile component content and a particle size of 0–0.5 mm whose finest particle component was 55–60% amounting to < 0.06 mm was under spraying of water formed into balls and pelleterized to a size of 3 mm. The pellets were heated in a rotating oven at 750°C to form coke by passing nitrogen thereover for 30 minutes and then adding 100 g toluene to the gas stream at $Nm^3$ to thereby obtain a coke having volatile component content of 3%. Thereafter the coke pellets were cooled under an inert nitrogen gas stream.

The text for evaluating the coke yielded a gas of the following composition: 37 volume % and 63 volume % $N_2$.

EXAMPLE 4

76 Weight parts wood coke having a particle size 100% < 0.1 mm were mixed with 4 weight parts soft pitch (softening point according to Kraemer-Sarnow of 52°–56°C) under addition of water at about 70°C. The mixture was then introduced into an extrusion press and cylindrical shaped bodies having a cross section of 2 mm formed. The bodies were introduced into a rotating oven and were heated therein at temperature increases amounting on the average to 10°C per minute until a final temperature of 800°C had been reacted, under exclusion of air. Thereafter, under introduction of nitrogen the bodies were cooled to room temperature. The thusly formed product had a volatile component content of 1.5%.

The test for evaluating the quality of the bodies resulted in a gas having a composition of 38 volume % oxygen and 62 volume % nitrogen.

EXAMPLE 5

76 Weight parts wood coke having a particle size 100% < 0.1 mm were mixed with 24 weight parts soft pitch (softening point according to Kraemer-Sarnow of 52°–58°C) under addition of water at about 70°C. The mixture was then introduced into an extrusion press and formed into cylindrical bodies having a cross section of 2 mm. The bodies were introduced into a rotating oven and under exclusion of air carbonized by increasing the temperature an average of 10° per minute up until a final temperature of 800°C. After a temperature of 750°C had been reached, a nitrogen gas stream was introduced and after a temperature of 800°C had been established isopropanol in an amount of 100 g/Nm³ was charged. The treatment in the isopropanol-nitrogen atmosphere lasted for 20 minutes. Thereafter the bodies were cooled under a pure nitrogen atmosphere.

When the test for evaluating the quality was carried out a gas having a composition of 49 volume % oxygen and 51 volume % nitrogen was obtained.

EXAMPLE 6

Coconut shell material having a particle size of 1 to 3 mm was introduced into a rotating oven and heated up at a rate of 3° per minute until the temperature of 750°C had been reached and their volatile component content amounted to 4.5%. This temperature was maintained constant for 30 minutes and during this time there was introduced into the oven a stream of ethylene gas. Thereafter the bodies were cooled under pure nitrogen.

When the evaluation test was carried out, a gas having a composition of 50.5 volume % oxygen and 49.5 volume % nitrogen was obtained.

EXAMPLE 7

75 Weight parts of mineral coal, the particle size of which amounted to 100% < 0.08 mm was preoxidized in a fluidized bed with oxygen at 230°C to produce a content of oxygen of 12 weight %. This product was mixed with 20 weight parts soft pitch (softening point according to Kraemer-Sarnow of 52°–56°C) under addition of water at about 70°C. This mixture was then introduced into an extrusion press and cylndrical shaped bodies having a cross section of 2 mm formed. The bodies were then charged into a rotating oven and heated therein under exclusion of air at an average temperature increase of 10°/min. up until a final temperature of 800°C. Then under introduction of nitrogen, the bodies were cooled to room temperature. In a second treatment step, the product was again heated in nitrogen to 800°C. Then in the nitrogen gas stream low temperature carbonization gas obtained in a coking procedure was introduced. After 30 minutes the bodies were cooled under nitrogen to room temperature.

The test for evaluating the quality of the bodies was carried out and a gas having a composition of 45 volume % oxygen and 55 volume % nitrogen obtained.

EXAMPLE 8

Peat coke was worked up to a particle size of from 1 to 3 mm and heated in a rotating oven under nitrogen to 800°C. There was then introduced with the nitrogen gas stream, gaseous toluene and the temperature maintained constant for 30 minutes. Finally the bodies were cooled in pure nitrogen.

The test for evaluating the quality of the bodies produced a gas having a composition of 36 volume % oxygen and 64 volume % nitrogen.

The two adsorption vessels as shown in the drawing contain 20 m³ molecular sieve type carbon, manufactured according to Example 1. During the adsorption cycle 6000 m³ air, which has neither been dried nor freed of carbondioxide, are charged through each of the adsorption vessels for periods of 100 seconds at a pressure of 1.05 atm. The desorption cycle also takes 100 seconds at a pressure of 50 Torr produced by vacuum suction. Through alternate operation of the two adsorption vessels a product containing 51% oxygen and 49% nitrogen will be recovered.

Two adsorption vessels, similar to those described in the drawing are filled with 1000 ccm molecular sieve type carbon manufactured according to Example 6. Adsorption is achieved by pumping a gas volume of 28000 ccm, consisting of 5% He and 95% $CH_4$ alternately into each adsorption vessel, using a pressure of 40 atm. The time required amounts to 30 seconds. In the second step of the procedure the pressure is abruptly released to 1 atm. In step 3, desorption takes place at pressures reaching a minimum of 20 Torr by use of vacuum suction, 1000 ccm of gas will be recovered containing 20% He and 30% $CH_4$.

What is claimed is:

1. In a process for the production of a carbon-containing molecular sieve, the step of contacting particulate coke having pores of a first effective size with a carbonaceous gaseous substance when said coke has a temperature in excess of about 600°C, said carbonaceous substance splitting off carbon at said temperature, and said carbon being at least partially deposited in said pores to thereby reduce the effective size of said pores from said first effective size to a smaller second effective size.

2. A process as defined in claim 1, wherein said particulate coke comprises particles having a particle size between substantially 0.1 and 20 millimeters.

3. A process as defined in claim 1, wherein said coke has a volatile components content of at most about 5 percent.

4. A process as defined in claim 1, wherein said temperature is at most about 900°C.

5. A process as defined in claim 1, wherein the step of contacting said coke with said gaseous carbonaceous substance is performed in a substantially inert atmosphere.

6. A process as defined in claim 1, wherein the step of contacting said coke with said gaseous carbonaceous substance is carried out for a period between substantially 1 and 60 minutes.

7. A process as defined in claim 1, wherein said second size is less than about 0.3 millimicrons.

8. A process as defined in claim 1, and further comprising the step of coking a particulate cokable material at a coking temperature in excess of substantially 600°C so as to obtain said particulate coke.

9. A process as defined in claim 8, said cokable material having a volatile components content in excess of 5 percent; and wherein said coking is performed in a substantially airless atmosphere and for a period of time sufficient to reduce said volatile components content to less than about 5 percent.

10. A process as defined in claim 8, wherein the step of contacting said particulate coke with said gaseous carbonaceous substance is effected without cooling the particulate coke obtained from the coking step below 600°C.

11. A process as defined in claim 8; and further comprising the step of forming shaped bodies from said cokable material and at least one binding agent selected from the group consisting of pitches, bitumens, tar and tar oils, the step of forming said shaped bodies being performed prior to said coking.

12. A process as defined in claim 11, said binding agent generating gaseous coking products during said coking; and wherein said gaseous carbonaceous substance comprises said gaseous coking products.

13. A process as defined in claim 11, wherein said binding agent constitutes substantially 15 to 40 percent by weight of said shaped bodies.

14. A process as defined in claim 8; and further comprising the step of oxidizing said cokable material prior to said coking.

15. A process as defined in claim 14, wherein said oxidation is carried out at a temperature of substantially 230°C.

16. A process as defined in claim 14, wherein the step of oxidizing said cokable material comprises passing a stream of an oxygen-containing gas through said cokable material so as to form a fluidized bed of said cokable material.

17. A process as defined in claim 14, wherein said cokable material has an oxygen content of substantially 12 percent by weight subsequent to the oxidizing step.

18. A process as defined in claim 8, wherein the coking step comprises heating said cokable material at a rate of substantially 3° to 10°C per minute.

19. A process as defined in claim 1, wherein said gaseous carbonaceous substance comprises at least one substance selected from the group consisting of coke-oven gas, illuminating gas and municipal gas.

20. A process as defined in claim 1, wherein said gaseous carbonaceous substance comprises at least one substance selected from the group consisting of benzene, toluene, xylene, naphthalene, methane, ethane, hexane, cyclohexane, ethylene, acetylene, methanol, ethanol, isopropanol, methylene chloride and carbon tetrachloride.

21. A process for the production of a carbon-containing molecular sieve which adsorbs oxygen more readily than nitrogen from mixtures containing oxygen and nitrogen which comprises heating coke particles having a size between substantially 0.1 and 20 millimeters and a volatile components content of at most about 5 percent in a substantially inert atmosphere at a temperature between substantially 600° and 900°C while a gaseous stream of a carbonaceous substance which splits off carbon at said temperature is passed into contact with said coke particles for such a period between about 1 and 60 minutes that the carbon which is thus split off is deposited in the pores of said coke particles and reduces the effective average size of said pores to less than about 0.3 millimicrons.

* * * * *